United States Patent
Baer

(12) 
(10) Patent No.: US 6,714,241 B2
(45) Date of Patent: Mar. 30, 2004

(54) EFFICIENT DARK CURRENT SUBTRACTION IN AN IMAGE SENSOR

(75) Inventor: Richard L. Baer, Los Altos, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 408 days.

(21) Appl. No.: 09/842,553

(22) Filed: Apr. 25, 2001

(65) Prior Publication Data

US 2002/0167600 A1 Nov. 14, 2002

(51) Int. Cl.[7] ................................................ H04N 5/217
(52) U.S. Cl. ....................................................... 348/241
(58) Field of Search ................................ 348/241, 243, 348/245, 248, 249, 250; 382/274; 358/463

(56) References Cited

U.S. PATENT DOCUMENTS

| 5,376,966 | A | * | 12/1994 | Takase | 348/243 |
| 5,642,162 | A | * | 6/1997 | Maki et al. | 348/241 |
| 5,940,125 | A | * | 8/1999 | Suganuma | 348/243 |
| 6,061,092 | A | * | 5/2000 | Bakhle et al. | 348/243 |
| 6,101,287 | A | * | 8/2000 | Corun et al. | 382/274 |
| 6,144,408 | A | * | 11/2000 | MacLean | 348/241 |
| 6,563,536 | B1 | * | 5/2003 | Rashkovskiy et al. | 348/243 |

* cited by examiner

*Primary Examiner*—Wendy R. Garber
*Assistant Examiner*—Rashawn N. Tillery

(57) ABSTRACT

A method for dark current subtraction which enables a dark frame to be reused for dark current subtraction for multiple image frames. The dark frame is reused by scaling it according to changes in the dark current levels associated with the dark frame and the image frames.

18 Claims, 4 Drawing Sheets

EFFICIENT DARK CURRENT SUBTRACTION IN AN IMAGE SENSOR

BACKGROUND OF THE INVENTION

1. Field of Invention

The present invention pertains to the field of image sensors. More particularly, this invention relates to efficient dark current subtraction for an image sensor.

2. Art Background

A typical image sensor includes a set of sensing elements which generate electrical charge in response to light. For example, one type of image sensor is a charge-coupled device (CCD) array. A typical CCD array includes an array of CCD sensing elements and circuitry for sampling the charge levels of the CCD sensing elements.

A variety of images sensors including CCD arrays have light sensing elements which accumulate an electrical charge even in the absence of light. The electrical charge that accumulates in a sensing element in the absence of light is commonly referred to as dark current. Typically, the dark current in an image sensor creates an undesirable "dark" image that overlays the optical image.

One prior method for removing the effects of dark current in an image sensor is to perform dark current subtraction. Typically, an image is obtained from the image sensor when it is illuminated by light from an image scene and an image is obtained from the image sensor when it is not illuminated. The image obtained when the image sensor is illuminated may be referred to as an image frame. The image obtained when the image sensor is not illuminated may be referred to as a dark frame. The dark frame is usually subtracted from the image frame to yield an image frame without the dark current component.

Prior methods for dark current subtraction usually obtain a dark frame each time an image frame is obtained because the dark current typically varies according to temperature and exposure. Unfortunately, the time consumed in obtaining a dark frame each time an image frame is obtained usually slows the rate at which useful images may be obtained with an image sensor.

SUMMARY OF THE INVENTION

A method for dark current subtraction is disclosed which enables a dark frame to be reused for dark current subtraction for multiple image frames. The dark frame is reused by scaling it according to changes in the dark current levels associated with the dark frame and the image frames. In one embodiment, the changes in dark current levels are determined by examining changes in charge samples from optically black sensing elements and dummy samples from circuitry in the image sensor.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
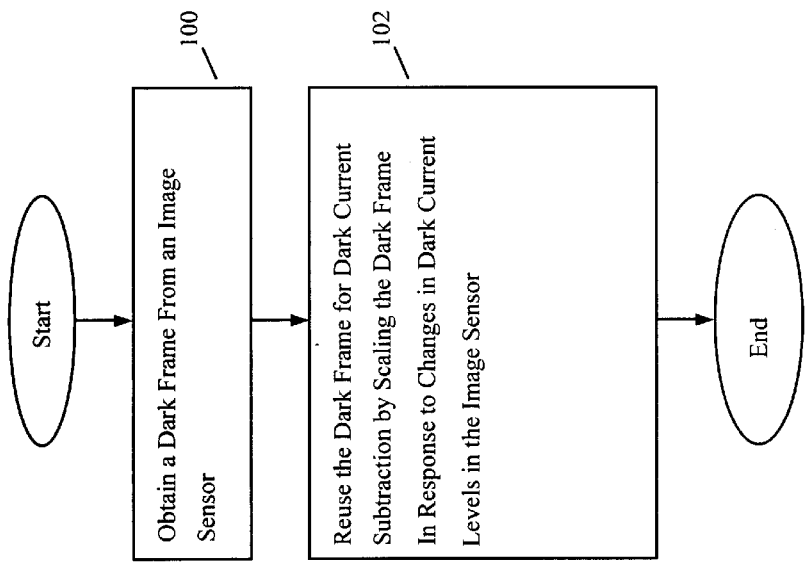
FIG. 1 shows a method for dark current subtraction according to the present teachings.

FIG. 1 shows a method for dark current subtraction according to the present teachings. This method may be used, for example to perform dark current subtraction for an image sensor in a digital still camera or digital video camera.

At step 100, a dark frame is obtained from the image sensor. Step 100 may be performed, for example, by closing a shutter on the camera that contains the image sensor and obtaining samples from the image sensor.

At step 102, the dark frame obtained at step 100 is reused for dark current subtraction for multiple image frames obtained from the image sensor. The dark frame obtained at step 100 may be reused at step 102 by obtaining an image frame from the image sensor when it is illuminated by light from an image scene and then determining a difference between dark current levels associated with the image frame obtained at step 102 and dark current levels associated with the dark frame obtained at step 100. The dark frame obtained at step 100 may then be scaled according to the difference and then subtracted from the image frame obtained at step 102.

The dark frame obtained at step 100 and the image frame obtained at step 102 each include a sample from each of a set of active elements of the image sensor and a sample from each of a set of optically black elements in the image sensor. In addition, the dark frame obtained at step 100 and the image frame obtained at step 102 each include a set of dummy samples that represent a low charge level in the image sensor. In one embodiment, the dummy samples are obtained by over-clocking an output register in the image sensor.

In one embodiment, the difference between the dark current levels associated with the dark frame and the image frame is determined by determining differences between samples from the optically black elements and the dummy samples.

Figure 2:
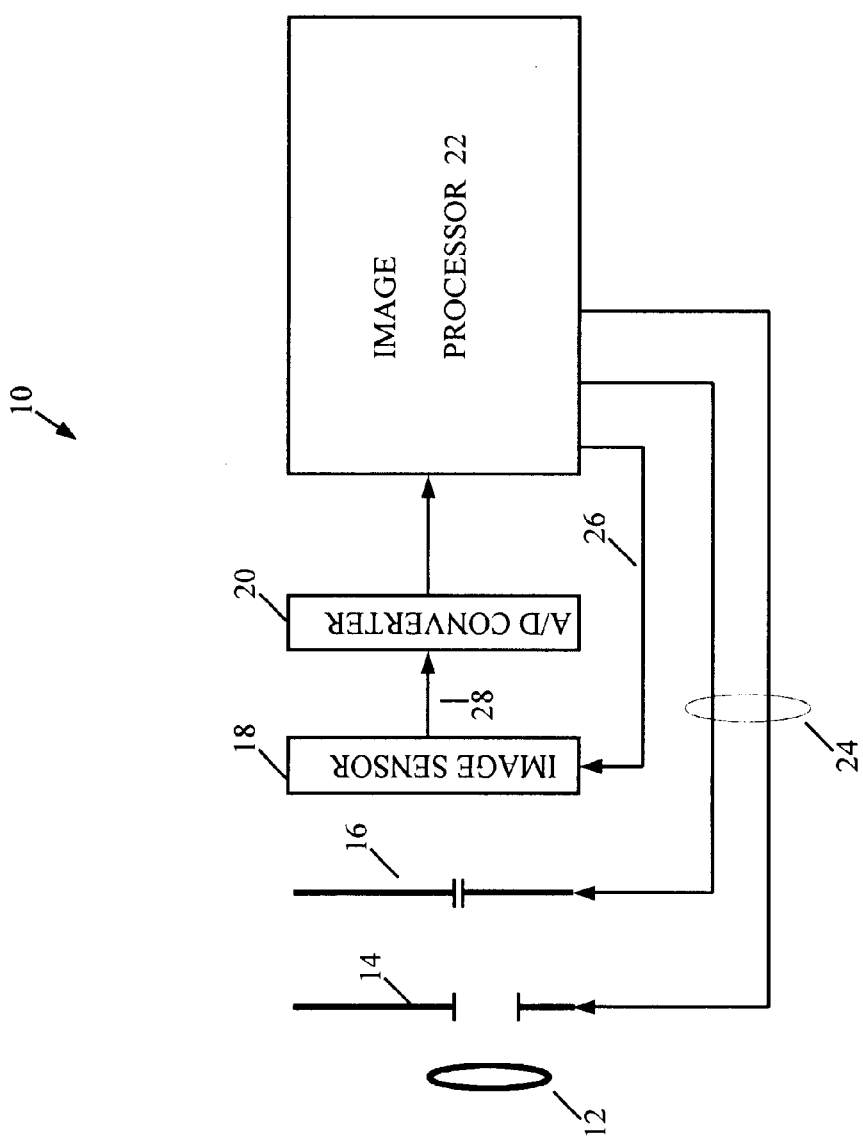
FIG. 2 shows a camera which incorporates the present teachings.

FIG. 2 shows a camera 10 which incorporates the present teachings. The camera 10 includes a lense mechanism 12 that conducts light from an image scene through an aperture mechanism 14 and a shutter mechanism 16 to an image sensor 18. An image processor 22 controls the aperture mechanism 14 and the shutter mechanism 16 via a set of control signals 24.

The image sensor 18 accumulates electrical charge in its sensing elements during exposure periods which the image processor 22 controls via a set of control signals 26. The image sensor 18 also accumulates charge in its sensing elements during exposure periods as a result of dark currents in the image sensor 18.

The image processor 22 generates signals via the control signals 24 and 26 to start exposure periods, stop exposure periods and to read out samples from the image sensor 18. The samples obtained from the image sensor 18 are provided to an analog-to-digital (A/D) converter 20 via an output signal 28. The A/D converter 20 digitizes the samples carried by the output signal 28 and provides the corresponding digitized samples to the image processor 22.

The image processor 22 controls the aperture mechanism 14 and the shutter mechanism 16, and the image sensor 18 to obtain digitized samples for a dark frame at step 100 and for an image frame at step 102. For example, a dark frame may be obtained by closing the shutter mechanism 16 using the control signals 24 and then using the control signals 26 to obtain samples from the image sensor 18. An image frame may be obtained by setting an exposure with the aperture mechanism 14 and the shutter mechanism 16 using the control signals 24 and then using the control signals 26 to obtain samples from the image sensor 18.

In one embodiment, the camera 10 is a still image camera. In another embodiment, the camera 10 is a video camera.

The image sensor 18 may be a CCD array or complementary metal-oxide semiconductor (CMOS) array. The image processor 22 including dark current subtraction functionality may be implemented in hardware and/or software or firmware. The aperture mechanism 14 and the shutter mechanism 16 may be any known mechanisms useful in cameras.

Figure 3:
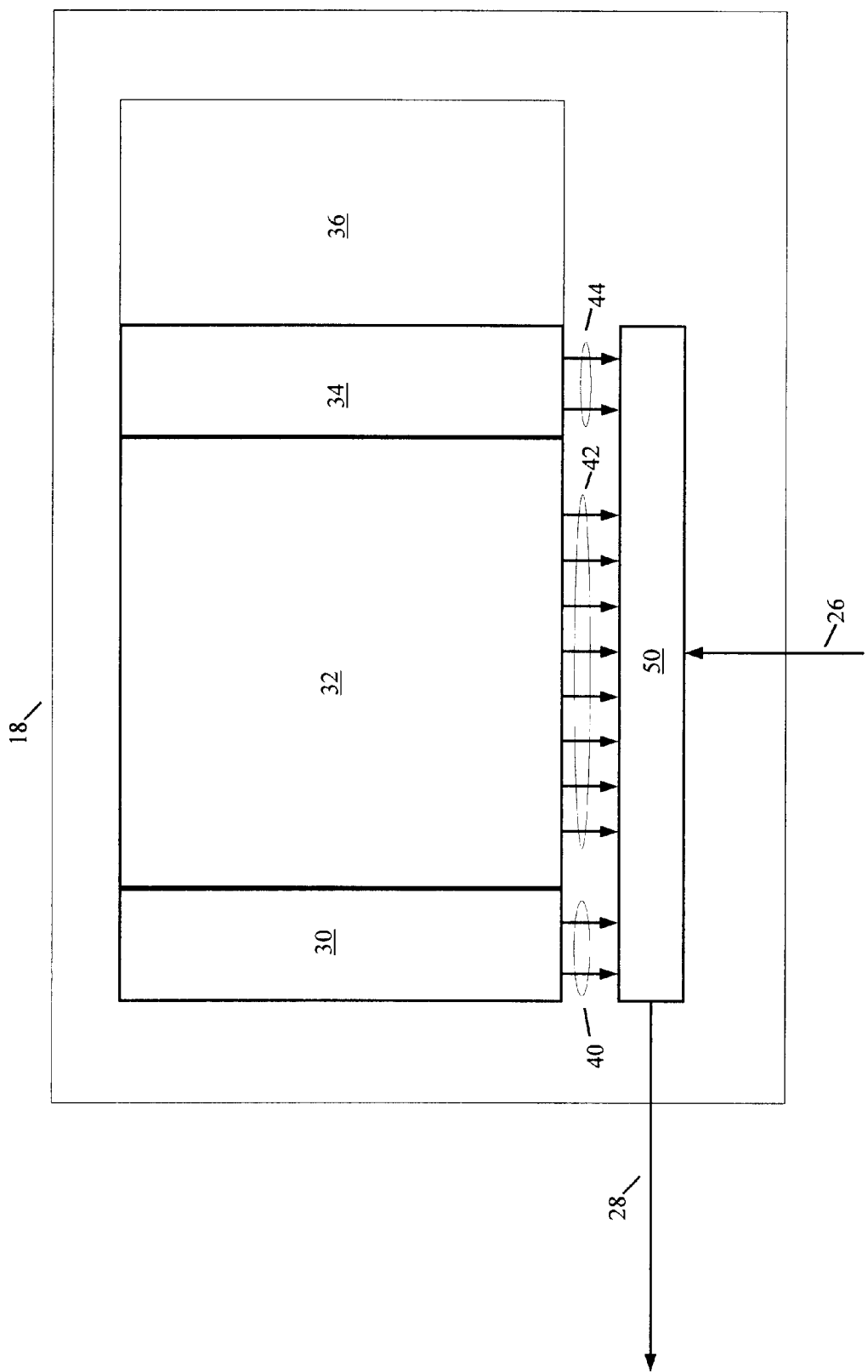
FIG. 3 shows an example arrangement of elements in an image sensor including active elements and optically black elements and a representation of dummy elements.

FIG. 3 shows an example arrangement of elements in the image sensor 18. In this example, the image sensor 18 includes an array with a set of active elements 32, two sets of optically black elements 30 and 34, and an output register 50. In one embodiment, the active elements 32 are CCD light sensing elements and the optically black elements 30 an 34 are CCD light sensing elements that are covered with a material that blocks light.

The output register 50 is used to read out charge samples from the active elements 32 and the optically black elements 30 and 34. Circuitry (not shown) in the image sensor 18 selects the rows the active elements 32 and the optically black elements 30 and 34 in sequence. Charge from a selected row of the active elements 32 is provided to the output register 50 via a set of signal lines 42 and charge from a selected row of the optically black elements 30 and 34 is provided to the output register 50 via sets of signal lines 40 and 44.

Once a row of charge samples has been collected in the output register 50, the image processor 22 clocks out the row of samples serially onto the output signal 28 using the control signals 26. In this example, a row of samples includes 2 optically black samples, 8 active samples and 2 optically black samples. The image processor 22 obtains these samples by generating 12 transitions or edges of clock signal portion of the control signals 26 to shift out these samples onto the output signal 28.

The image processor 22 obtains dummy samples from the image sensor 18 by over-clocking the output register 50. The dummy samples represent a low charge level in the image sensor 18 for purposes of scaling dark current when reusing a dark frame. The dummy samples may be treated as if the image sensor 18 included an area 36 of dummy elements which are devoid of dark. For example, the image processor 22 obtains 4 dummy samples for a row by generating 4 extra transitions or edges of the clock signal on the control signals 26 after clocking out the samples from the optically black and active elements.

Figure 4:
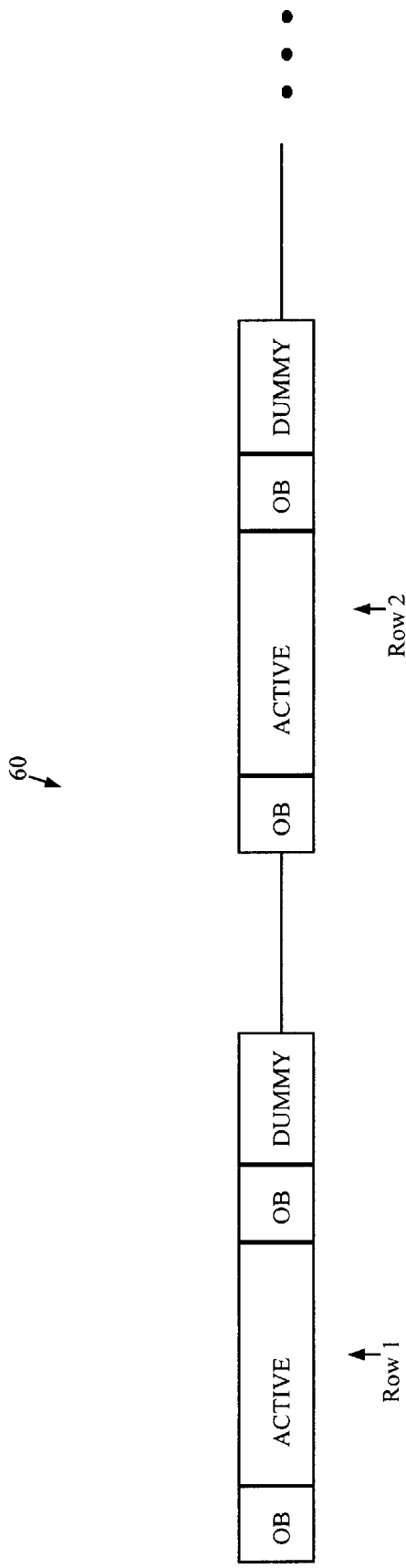
FIG. 4 shows a data frame obtained via an output signal of an image sensor.

FIG. 4 shows a data frame 60 obtained from the image sensor 18 via the output signal 28. The data frame 60 may be a dark frame obtained at step 100 or an image frame obtained at step 102. The data frame 60 includes a series of row samples (row 1–n) wherein n is the number of rows of sensing elements in the image sensor 18.

Each row 1–n includes a set of samples (OB) from the optically black elements 30 followed by a set of samples (ACTIVE) from the active elements 32 followed by a set of samples (OB) from the optically black elements 34 followed by a set of dummy samples (DUMMY) from what is represented as the area 36.

The image processor 22 determines an average intensity of the samples from the optically black elements in a dark frame ($D_{OB}$) and an average intensity of the dummy samples in the dark frame ($D_{DUMMY}$). The averages $D_{OB}$ and $D_{DUMMY}$ may be computed for all of the samples or a subset of the samples in the dark frame.

The image processor 22 determines an average intensity of the samples from the optically black elements in an image frame ($I_{OB}$) and an average intensity of the dummy samples in the image frame ($I_{DUMMY}$). The averages $I_{OB}$ and $I_{DUMMY}$ may be computed for all of the samples or a subset of the samples in the image frame.

The samples from the active elements 32 in a dark frame obtained at step 100 are $D_{ACTIVE}$ (1,1) through $D_{ACTIVE}$ (n,m), where n is the number of rows and m is the number of columns in the active elements 32. The samples from the active elements 32 for an image frame obtained at step 102 are $I_{ACTIVE}$ (1,1) through $I_{ACTIVE}$ (n,m). The dark frame obtained at step 100 is scaled at step 102 in one embodiment by multiplying $D_{ACTIVE}$ (1,1) through $D_{ACTIVE}$ (n,m) by the following scale factor:

$$\frac{I_{OB} - D_{DUMMY}}{D_{OB} - D_{DUMMY}}$$

The scaled dark frame obtained using the above scale factor is subtracted from $I_{ACTIVE}$ (1,1) through $I_{ACTIVE}$ (n,m) element by element when performing dark current subtraction at step 102.

The time taken to generate a scaled dark frame from a stored dark frame using the above technique is less than the time taken to close the shutter mechanism 16 and obtain a new dark frame. This reuse of a dark frame enables an increased rate of image frame sampling in the camera 10. A dark frame may be stored in a memory associated with the image processor 22 and re-scaled and reused for each acquired image frame thereafter.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for dark current subtraction, comprising the steps of:
    obtaining a dark frame from an image sensor;
    reusing the dark frame for dark current subtraction by scaling the dark frame in response to changes in dark current levels in the image sensor wherein the step of scaling includes the step of determining a difference between dark current levels in an image frame and dark current levels in the dark frame in response to a set of dummy samples in the image frame and the dark frame that represent a low charge level in the image sensor.

2. The method of claim 1, wherein the step of reusing the dark frame for dark current subtraction comprises the steps of:
    obtaining the image frame from the image sensor;
    determining a difference between dark current levels associated with the image frame and dark current levels associated with the dark frame;
    determining a scaled dark frame from the dark frame according to the difference;
    subtracting the scaled dark frame from the image frame.

3. A method for dark current subtraction, comprising the steps of obtaining a dark frame from an image sensor and reusing the dark frame for dark current subtraction by scaling the dark frame in response to changes in dark current levels in the image sensor wherein the step of reusing the dark frame for dark current subtraction comprises the steps of obtaining an image frame from the image sensor, determining a different between dark current levels associated with the image frame and dark current levels associated with the dark frame, determining a scaled dark frame from the dark frame according to the difference, and subtracting the scaled dark frame from the image frame and wherein the step of obtaining dark frame comprises the steps of:
    obtaining a dark sample from each of a set of active elements of the image sensor;
    obtaining a dark sample from each of a set of optically black elements of the image sensor;

obtaining a set of dummy samples that represent a low charge level in the image sensor.

4. The method of claim 3, wherein the step of obtaining a set of dummy samples comprises the step of over-clocking an output register in the image sensor.

5. The method of claim 3, wherein the step of obtaining an image frame comprises the steps of:
   obtaining an image sample from each active element;
   obtaining an image sample from each optically black element;
   obtaining a set of dummy samples from the image sensor.

6. The method of claim 5, wherein the step of determining a difference between the dark current levels comprises the steps of:
   determining a difference between a subset of the image samples from the optically black elements and a subset of the dummy samples;
   determining a difference between a subset of the dark samples from the optically black elements and a subset of the dummy samples.

7. The method of claim 6, wherein the step of determining a difference between a subset of the image samples from the optically black elements and a subset of the dummy samples comprises the steps of:
   determining an average of the subset of the image samples from the optically black elements;
   determining an average of the subset of the dummy samples;
   determining a difference between the averages.

8. The method of claim 6, wherein the step of determining a difference between a subset of the dark samples from the optically black elements and a subset of the dummy samples comprises the steps of:
   determining an average of the subset of the dark samples from the optically black elements;
   determining an average of the subset of the dummy samples;
   determining a difference between the averages.

9. The method of claim 6, wherein the step of determining a scaled dark frame comprises the step of multiplying the dark frame by a ratio of the difference between the subsets.

10. An apparatus for dark current subtraction, comprising:
    means for obtaining a dark frame from an image sensor;
    means for reusing the dark frame for dark current subtraction by scaling the dark frame in response to changes in dark current levels in the image sensor wherein the means for reusing includes means for determining a difference between dark current levels in an image frame and dark current levels in the dark frame in response to a set of dummy samples in the image frame and the dark frame that represent a low charge level in the image sensor.

11. The apparatus of claim 10, wherein the means for reusing the dark frame for dark current subtraction comprises:
    means for obtaining the image frame from the image sensor;
    means for determining a difference between dark current levels associated with the image frame and dark current levels associated with the dark frame;
    means for determining a scaled dark frame from the dark frame according to the difference;
    means for subtracting the scaled dark frame from the image frame.

12. An apparatus for dark current subtraction, comprising means for reusing the dark frame from an image sensor, means for reusing the dark frame for dark current subtraction by scaling the dark frame in response to changes in dark current levels in the image sensor wherein the means for reusing the dark frame for dark current subtraction comprises means for obtaining an image frame from the image sensor, means for determining a difference between dark current levels associated with the image frame and dark current levels associated with the dark frame, means for determining a scaled dark frame from the dark frame according to the difference, and means for subtracting the scaled dark frame from the image frame wherein the means for obtaining a dark frame comprises:
    means for obtaining a dark sample from each of a set of active elements of the image sensor;
    means for obtaining a dark sample from each of a set of optically black elements of the image sensor;
    means for obtaining a set of dummy samples that represent a low charge level in the image sensor.

13. The apparatus of claim 12, wherein the means for obtaining a set of dummy samples comprises means for over-clocking an output register in the image sensor.

14. The apparatus of claim 12, wherein the means for obtaining an image frame comprises:
    means for obtaining an image sample from each active element;
    means for obtaining an image sample from each optically black element;
    means for obtaining a set of dummy samples from the image sensor.

15. The apparatus of claim 14, wherein the means for determining a difference between the dark current levels comprises:
    means for determining a difference between a subset of the image samples from the optically black elements and a subset of the dummy samples;
    means for determining a difference between a subset of the dark samples from the optically black elements and a subset of the dummy samples.

16. The apparatus of claim 15, wherein the means for determining a difference between a subset of the image samples from the optically black elements and a subset of the dummy samples comprises:
    means for determining an average of the subset of the image samples from the optically black elements;
    means for determining an average of the subset of the dummy samples;
    means for determining a difference between the averages.

17. The apparatus of claim 15, wherein the means for determining a difference between a subset of the dark samples from the optically black elements and a subset of the dummy samples comprises:
    means for determining an average of the subset of the dark samples from the optically black elements;
    means for determining an average of the subset of the dummy samples;
    means for determining a difference between the averages.

18. The apparatus of claim 15, wherein the means for determining a scaled dark frame comprises means for multiplying the dark frame by a ratio of the difference between the subsets.

* * * * *

UNITED STATES PATENT AND TRADEMARK OFFICE
CERTIFICATE OF CORRECTION

| | | |
|---|---|---|
| PATENT NO. | : 6,714,241 B2 | Page 1 of 1 |
| APPLICATION NO. | : 09/842553 | |
| DATED | : March 30, 2004 | |
| INVENTOR(S) | : Richard L. Baer | |

It is certified that error appears in the above-identified patent and that said Letters Patent is hereby corrected as shown below:

In the Claims:
Column 6, line 2, in Claim 12, delete "reusing the" and replace with --obtaining a--.

Signed and Sealed this
Twenty-eighth Day of July, 2015

Michelle K. Lee
*Director of the United States Patent and Trademark Office*

UNITED STATES PATENT AND TRADEMARK OFFICE
CERTIFICATE OF CORRECTION

PATENT NO.        : 6,714,241 B2                                           Page 1 of 1
APPLICATION NO.   : 09/842553
DATED             : March 30, 2004
INVENTOR(S)       : Richard L. Baer It is certified that error appears in the above-identified patent and that said Letters Patent is hereby corrected as shown below:

In the Claims

In column 4, line 59, claim 3, please delete "different" and replace with --difference--.

Signed and Sealed this
Twenty-fourth Day of May, 2016

Michelle K. Lee
*Director of the United States Patent and Trademark Office*